US012779326B2

(12) United States Patent
Firoozye

(10) Patent No.: US 12,779,326 B2
(45) Date of Patent: Nov. 3, 2026

(54) SYSTEM AND METHOD FOR DYNAMIC INTERACTIVE GAMING WITH A VARIABLE WEIGHTING FRAMEWORK

(71) Applicant: Ramin Firoozye, Berkeley, CA (US)

(72) Inventor: Ramin Firoozye, Berkeley, CA (US)

(73) Assignee: Ramin Firoozye, Berkeley, CA (US)

( * ) Notice: Subject to any disclaimer, the term of this patent is extended or adjusted under 35 U.S.C. 154(b) by 0 days.

(21) Appl. No.: 19/424,603

(22) Filed: Dec. 18, 2025

(65) Prior Publication Data

US 2026/0175123 A1 Jun. 25, 2026

Related U.S. Application Data

(60) Provisional application No. 63/737,098, filed on Dec. 20, 2024.

(51) Int. Cl.

*A63F 13/30* (2014.01)
*A63F 13/211* (2014.01)
*G06F 7/58* (2006.01)
*G07F 17/32* (2006.01)

(52) U.S. Cl.

CPC ............ *A63F 13/30* (2014.09); *A63F 13/211* (2014.09); *G06F 7/58* (2013.01); *G07F 17/3244* (2013.01)

(58) Field of Classification Search

CPC ...... A63F 13/30; A63F 13/211; A63F 13/428; A63F 13/245; A63F 13/00; A63F 13/20; A63F 13/24; G06F 7/58; G06F 7/3244; H04L 65/00

See application file for complete search history.

(56) References Cited

U.S. PATENT DOCUMENTS

2008/0005244 A1 1/2008 Vernon et al.
2008/0254852 A1* 10/2008 Wright .................... G07F 17/32 463/17
2011/0295943 A1 12/2011 Peuziat et al.
2013/0237304 A1* 9/2013 Oakes ..................... G07F 17/32 463/16

(Continued)

OTHER PUBLICATIONS

Firoozye, Ramin , PCT/US2025/060263, filed Dec. 18, 2025, "Notification of Transmittal of the International Search Report and the Written Opinion of the International Searching Authority, or the Declaration" dated Mar. 9, 2026, 8 pages.

*Primary Examiner* — Mewale A Ambaye
(74) *Attorney, Agent, or Firm* — POLSINELLI LLP

(57) ABSTRACT

In one aspect, the method may include generating a communication session and receiving one or more communication requests from one or more user devices. The one or more communication requests may include an associated resource and the one or more user devices may be associated with a weight value. The method may further include combining the one or more communication requests and the associated resources into an object associated with the communication session. The method may further include determining an impacted group of user devices using a random number generator biased by the weight values associated with the one or more user devices. The method may further include deriving a value of the object to be allocated to user devices of the impacted group. The method may further include allocating a quantity of resources corresponding to the value of the object to the user devices of the impacted group.

18 Claims, 5 Drawing Sheets

(56) References Cited

U.S. PATENT DOCUMENTS

| | | | | |
|---|---|---|---|---|
| 2014/0295975 | A1 | 10/2014 | Van Luchene | |
| 2016/0132608 | A1 | 5/2016 | Rathod | |
| 2022/0095309 | A1* | 3/2022 | MolavianJazi | H04W 72/541 |
| 2022/0148377 | A1 | 5/2022 | Cleveland et al. | |
| 2022/0172638 | A1* | 6/2022 | Aharonson | G09B 15/00 |
| 2022/0330278 | A1* | 10/2022 | Hong | H04L 41/0803 |
| 2025/0217467 | A1* | 7/2025 | Awasthi | G06F 21/33 |

* cited by examiner

SYSTEM AND METHOD FOR DYNAMIC INTERACTIVE GAMING WITH A VARIABLE WEIGHTING FRAMEWORK

CROSS REFERENCE TO RELATED APPLICATIONS

This application claims priority to and the benefit of U.S. Provisional Application No. 63/737,098, filed Dec. 20, 2024, titled "SYSTEM AND METHOD FOR DYNAMIC INTERACTIVE GAMING WITH A VARIABLE WEIGHTING FRAMEWORK," which is hereby incorporated by reference in its entirety and for all purposes.

TECHNICAL FIELD

This disclosure relates generally to communication sessions, and more specifically to interactive communication sessions with a variable weighting framework.

BACKGROUND

Virtual games of chance facilitated by communication sessions involve the execution of games, such as lotteries, poker, or slot machines, in a digital environment where participants interact through electronic devices connected via communication networks. These games rely on software algorithms, including random number generators (RNGs), to simulate the random events central to games of chance. Communication sessions enable remote players to participate in real-time, allowing for multiplayer experiences, secure transactions, and interactive gameplay. However, virtual games of chance may cause feelings of disengagement, resulting in a poor experience for participants.

SUMMARY

Methods are described herein for an interactive communication session with a dynamic weighting framework. In one aspect, the method may include generating a communication session and receiving one or more communication requests from one or more user devices. The one or more communication requests may include an associated resource and the one or more user devices may be associated with a weight value. The method may further include combining the one or more communication requests and the associated resources into an object associated with the communication session. The method may further include determining an impacted group of user devices using a random number generator biased by the weight values associated with the one or more user devices. The impacted group may include at least one of the one or more user devices. The method may further include deriving a value of the object to be allocated to user devices of the impacted group. The value of the object may be based on the associated resources. The method may further include allocating a quantity of resources corresponding to the value of the object to the user devices of the impacted group.

Systems are described herein for an interactive communication session with a dynamic weighting framework. The systems may comprise one or more processors and a memory storing instructions that, as a result of being executed by the one or more processors, cause the system to perform any of the aforementioned methods.

Non-transitory computer-readable storage media are described herein that store instructions therein that, as a result of being executed by one or more processors, cause the one or more processors to perform the any of the aforementioned methods.

Various examples of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative examples mutually exclusive of other examples. Moreover, various features are described which can be exhibited by some examples and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various examples given in this specification.

Without intent to limit the scope of the disclosure, examples of instruments, apparatus, methods, and their related results according to the examples of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

BRIEF DESCRIPTION OF THE DRAWINGS

To easily identify the discussion of any particular element or act, the most significant digit or digits in a reference number refer to the figure number in which that element is first introduced.

Figure 1:
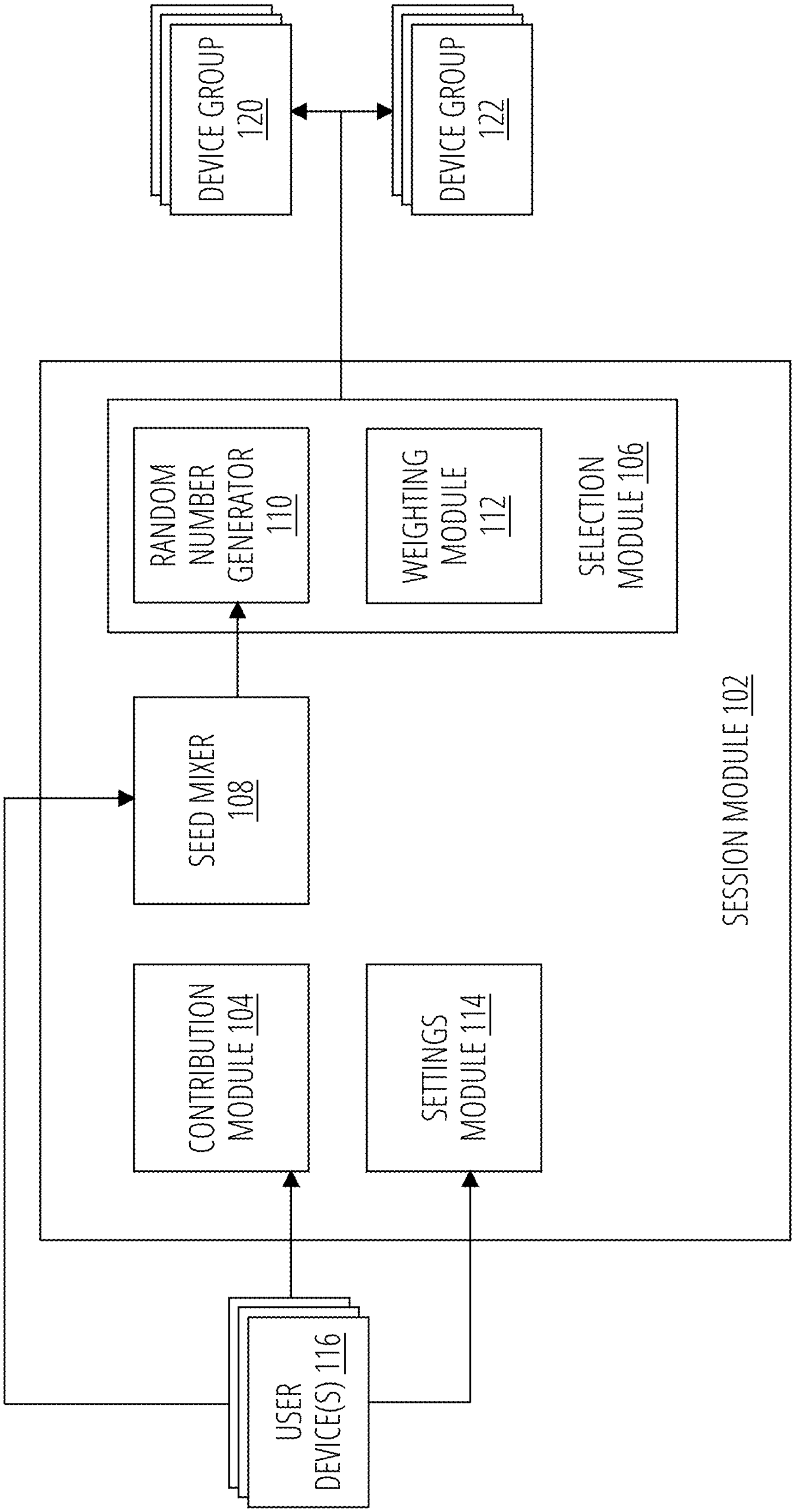
FIG. 1 illustrates an example diagram of a session module for facilitating a communication session according to some aspects of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive examples. However, it will be apparent that various examples may be practiced without these specific details. The figures and description are not intended to be restrictive. The word "exemplary" is used herein to mean "serving as an example, instance, or illustration." Any example or design described herein as "exemplary" is not necessarily to be construed as preferred or advantageous over other examples or designs.

Disclosed examples may provide a communication network that selectively allocates resources to user devices connected to communication sessions. One or more user devices may be connected to a communication session hosted on a communication network. Within the communication session, the one or more user devices may allocate a resource to be combined into an object that is associated with the communication session. The communication network may receive interaction data from the one or more user devices. In some examples, the interaction data received from each user device of the one or more user devices may modify a likelihood (e.g., bias) that the communication network may allocate the object (or a portion thereof) to the respective user device. The communication network may generate a seed using interaction data such as, but not limited to, the interaction data received from the one or more user devices, interaction data received from one or more other devices, and/or from sensors of the communication network. The communication may use a random number generator with the seed to define a group of user devices of the one or more user devices. The communication network may then distribute a portion of the object to user devices of the group of user devices proportionally according to the individual contribution of each user device.

User devices may identify communication sessions through an invitation (e.g., a link sent from a user device already connected to the communication session, sent from the communication network, and/or the like), through a search for a particular user device or communication session, through a recommendation from the communication network or user device, through a notification, a message board, a presentation of a list of available communication sessions (e.g., communication sessions accepting additional user devices, communication sessions that a user device is capable of connecting to or eligible to connect to, and/or the like), and/or the like. The one or more user devices may connect to a communication session by executing a link, transmitting a request to connect to a communication session, searching for and selecting an open communication session, etc.

The communication session may be facilitated through a mobile application, the Internet, an application, a network interface (e.g., a software and/or hardware interface, etc.), any combination thereof, or the like. The communication session may include a communication interface (e.g., a graphical user interface, input/output interface, application programming interface, combinations thereof, and/or the like) configured to transmit, receive, and/or present communications of the communication session.

The communication session may facilitate a dynamic gaming environment with a variable weighting framework. The communication session may request, from one or more user devices connected to the communication session, a resource. After a user device joins a communication session, the user device may allocate a resource of the user device to the communication session. Some, all, or none of the one or more user devices may opt to allocate a resource to the communication session. The resource may be associated with a particular value (e.g., fiat currency, digital tokens, non-fungible tokens, digital assets, etc.). In some examples, the resource allocated by the one or more user devices may be of different value (e.g., User Device A may allocate five tokens and User Device B may allocate 10 tokens). A communication network associated with the communication session may receive the resources from the one or more user devices and generate an object representing an aggregation of the received resources. The communication network may transmit, at a specific time and/or after the passing of a duration of time, a notification to the one or more user devices indicating that no further resources can be allocated. The communication session may request interaction data from the one or more user devices. The interaction data may include data from any sensor of a user device such as, but not limited to, accelerometer data, gyroscope data, microphone data, video data, NFC proximity chip data, facial recognition data, any combination thereof, or the like.

The interaction data may be used to modify a likelihood (e.g., bias) that the communication network will allocate some or all of the object to a particular user device or group of user devices. For example, the communication may be more likely to allocate resources to a user device within the communication session if the user device generates a specific type of interaction data (e.g., doing a particular dance move, making a funny face, shaking the user device, any combination thereof, or the like). In some examples, the interaction data may also be used to generate a seed for a random number generator. The random number generator may be used to identify a first group and a second group of the one or more user devices connected to the communication session. In some examples, the first group and the second group may be associated with different resource-allocation outcomes. For example, the communication network may allocate a portion of the object to the first group and may allocate nothing to the second group.

FIG. 1 illustrates an example diagram of a session module for facilitating a communication session according to some aspects of the present disclosure. Session module 102 may include one or more elements, such as contribution module 104, seed mixer 108, selection module 106, random number generator 110, weighting module 112, and settings module 114. These aforementioned elements may be used alone or in combination to produce the outcomes discussed throughout the present disclosure. In some examples, session module 102 may include additional elements not pictured and/or described in FIG. 1, including, but not limited to, servers, databases, and memory.

A communication network may include one or more session module 102. The communication network may be configured to facilitate communication sessions between user device(s) 116. Session module 102 may manage one or more communication session simultaneously. The communication network may include one or more processing devices (e.g., computing devices, mobile devices, servers, databases, etc.) configured to operate together to provide the services of the communication network. The one or more processing devices may operate with a same local network (e.g., such as a local area network, wide area network, mesh network, etc.) or may be distributed processing devices (e.g., such as a cloud network, distributed processing network, or the like). User device(s) 116 may connect to the communication network directly or through one or more intermediary networks (e.g., such as the Internet, virtual private networks, etc.). In some examples, session module 102 may be hosted on a server connected to the communication network. In some other examples, session module 102 may be hosted on a user device (e.g., a mobile phone, a desktop computer, a tablet, a laptop, etc.) that is connected to the communication network. In some examples, session module 102 may be split between the server connected to the communication network and the user device. For example, a seed for a random number generator may be generated on the server connected to the communication network, then transmitted to one or more user devices configured with respective random number generators, and the respective random number generators may operate using the seed.

The communication network may utilize session module 102 to facilitate communication sessions between user device(s) 116. Session module 102 may perform operations associated with communication sessions on the communication network, such as receiving an identification of resources from user device(s) 116, facilitating communications (e.g., message transmission, message routing, load balancing, etc.), configuring communication sessions, configuring random number generators, defining weighting algorithms, any combination thereof, and/or the like.

A first user device of user device(s) 116 may transmit a request to session module 102 to initiate a communication session. The request may be transmitted via an application programming interface (API) associated with the communication network. The user device that requests initiation of the communication session may be referred to as a managing user device. The managing user device may transmit the request via a user interface configured to receive input from a user, such as from a touchscreen, a keyboard, a mouse, a microphone, any combination thereof, or the like. The user interface may present a graphical user interface that may include one or more prompts, including, but not limited to, information pertaining to the request (e.g., configuration settings, template settings, session settings, etc.). In some examples, the graphical user interface may forward the request to the API to initiate the communication session.

The request may include configuration settings associated with the communication session, such as, but not limited to, a template, session settings, user device rules (e.g., age limits, geographical restrictions, etc.), resource limitations (e.g., resource types, resource amounts, a minimum and/or maximum resource value, etc.), privacy settings (e.g., "by invite only" session, public session, encryption algorithm, etc.), a start time and/or end time of the communication session (e.g., conclusion of the communication session after a duration of time, conclusion of the communication session after an event occurs, conclusion of the communication session after a particular action has been completed by associated user devices, etc.), combinations thereof, or the like. The configuration settings for a communication session may be implemented by settings module 114. In some examples, the communication session may be automatically initiated by an automated system instructed by a managing user device. For example, the managing user device may configure the request to include instructions to initiate a new communication session after the conclusion of a previous communication session.

Session module 102 may then instantiate a new communication session for the managing user device. The communication session may be configured by settings module 114 according to the configuration settings included within the request to initiate the communication session. In some examples, if a template is not included in the configuration settings, the communication session may generate the template based on the request (e.g., using a default template associated with the communication network). In some other examples, the communication session may load the template from a database of templates. The database of templates may include templates generated during previous communication session, templates generated by user devices (e.g., referred to as creating user devices, etc.), automatically generated templates (e.g., procedurally generated templates, etc.), combinations thereof, and/or the like. The database may be searchable by managing devices and/or the communication network.

Templates may include one or more template settings (e.g., design settings, security settings, language/currency settings, etc.) that may be applied to a communication session. For example, the template settings may include, but is not limited to, a title, description, story line, graphics, icons, sound, music, training models, database lookup tables, videos, references to streaming media, mini-games, language, metadata defining the communication session (e.g., authors, copyrights, geo-locations, languages, etc.), any combination thereof, or the like. The template may be generated within a module of session module 102 or may be generated on another platform and configured to integrate into session module 102. The managing user device may change one or more template settings within the selected template for the communication session (e.g., making a template that defaults as "public" to "private" for the communication session, changing primary colors from red to blue, etc.). Any changes in the template settings made by the managing user device to the selected template may not alter the template, but may only alter the instance of the selected template applicable to the communication session. In some examples, a template may be affiliated with a particular theme or entity such as, but not limited to a cause (e.g., charity, nonprofit, fundraiser, etc.), sports team, color, event, any combination thereof, or the like. The theme may be expressed through one or more template settings associated with the template, such as colors, graphics, fonts, symbols, any combination thereof, or the like. For example, the theme may be "football," and adorned with football graphics (e.g., helmets, footballs, football fields, foam fingers, etc.) and may primarily use colors associated with a particular team (e.g., a high school team, a professional team, a college team, etc.). In some examples, session module 102 may configure a machine-learning model trained to generate templates based on one or more keywords and/or phrases received from the managing user device. The machine-learning model may generate a template according to criteria (e.g., theme, colors, names, organizations, etc.) input by the managing user device. For example, a first machine-learning model may generate a template based on the input of "create a template for a high school fundraiser for the yearbook club."

In some examples, the managing user device may query the database for one or more templates that satisfies the query. The database may be hosted at a cloud-based database, a remote database, a local database, any combination thereof, or the like. The managing user device may select a template from the database and the selected template may download locally on the managing user device. In some examples, some or all of the templates may include one or more use conditions such as an exchange of resources to use the template in a communication session. For instance, a managing user device may transfer 10 virtual tokens for use of a soccer-themed template. Once a template is selected, it may be customized by the managing user device.

Further, the communication session may be configured by settings module 114 according to the configuration settings included within the request to initiate the communication session, which may include one or more session settings. The session settings may include, but are not limited to, geolocation limitations of participating user devices (e.g., only user devices located in a particular state, country, county, or the like may participate in a communication session; only user devices within a threshold distance of a physical beacon may participate in a communication session; etc.), time and/or duration of communication session, minimum and/or maximum number of participating user devices, minimum and/or maximum number of contributions, size of resulting object associated with the communication session, age of users associated with participating user devices, password protection (e.g., a user device can only enter and interact with the communication session after entering a password), privacy settings (e.g., users' names are anonymized, public/private sessions, etc.). In some examples, the settings may be determined by applicable laws in a geographic location. For example, some states may restrict contributing monetary funds to the communication session, while some states may restrict participants to 18+ years of age.

The communication network may instantiate the communication session configured by settings module 114. The managing user device may invite user device(s) 116 to connect to the communication session. User device(s) 116 may be associated with at least one user account. In some examples a first user account may be associated with more than one user device (e.g., a user account is associated with a mobile phone and a tablet). The managing user device may limit, in the session settings, participation of a user account in a communication session (e.g., two user devices associated with the same user account may not connect to the communication session). Similarly, a user device of user device(s) 116 may be associated with more than one user account (e.g., a user device may be associated with a first user account and a second user account). The session settings may also include limitations on participation of a second account associated with a user device that has previously connected to the communication session in association with a first account. In some examples, the communication session may be published in a table with other active communication sessions. The communication network may present the table to user device(s) 116 connected to the communication network. In some examples, the table presented to user device(s) 116 may be limited based on a geo-location associated with user device(s) 116, a proximity of user device(s) 116 to a physical beacon, technical capabilities of user device(s) 116, any combination thereof, or the like. For example, a user device may search the table for soccer-themed communication sessions within a certain geographical area. Managing user devices may transmit an invitation to user device(s) 116 to connect to the communication session of the managing user device. The invitation may be transmitted via email, text, push notification, SMS, website link, Near Field Communication (NFC) "tap," AirDrop™, Quick Response (QR) Code, direct messaging via social media, an embedded widget on a website, and/or the like. The invitation to join may be a link, a code, a graphic, an audio segment, quick-response (QR) code, any combination thereof, or the like.

In some examples, the managing user device may restrict the user devices that can connect to the communication session. The restrictions may be based on a phone number, email address, IP address, a Globally Unique Identifier (GUID) (e.g., associated with a user or a pre-defined group of users), etc. For example, a managing user device may provide email addresses associated with the user devices of user device(s) 116 that are authorized to connect to the communication session. A user device requesting to join the communication session may be authenticated using the email address associated with the user device. The communication network may match the email address associated with the user device with the email address provided by the managing user device to authenticate the user device. Alternatively, or additionally, the communication network may use other authentication techniques such as tokens, password, encryption (e.g., using public key and/or private key encryption, etc.), combinations thereof, and/or the like. In some examples, settings module 114, based on default settings from the communication network (e.g., from a central server and/or controller associated with the communication network), may implement a minimum number of user devices that may connect to a communication session. If a communication session does not meet the threshold number of user devices connected to the communication session, session module 102 (or an associated module) may generate simulated user devices to connect to the communication session. The simulated user devices may be associated with simulated contributions. The simulated user devices and/or simulated contributions may be configured according to settings associated with session module 102, settings module 114, and/or a central controller associated with the communication network.

At any point before the termination (e.g., end time, etc.) of the communication session, the managing user device may alter the settings of the communication session. For example, the managing user device may change the privacy setting of the communication session from "private" to "public." In some other examples, the managing user device may increase the number of maximum user devices that can simultaneously connect to the communication session.

During the communication session, user device(s) 116 may transmit resources (e.g., "a contribution", etc.) to the communication session. The contribution may be associated with a value. A user device may not be required to transmit a contribution when joining a communication session. In some examples, the contributions made by user device(s) 116 may not be of the same value (e.g., a first user device may contribute 15 tokens while a second user device may contribute 50 tokens). The contributions associated with the communication session may be of the same type (e.g., all tokens, all coins, etc.). In some other examples, the contributions made by user device(s) 116 may be of a same or different type (e.g., a first user device contributes tokens, while another user device contributes assets). The communication network may define a correspondence between contribution types to equate the value in one contribution type in other contribution types. For example, the communication network may indicate that 15 tokens corresponds to a value of three assets.

Contribution module 104 may receive the contributions from user device(s) 116 and combine the contributions into an object associated with the communication session. The contributions may be transformed, modified, summed, scaled, any combination thereof, or the like, to generate the object. In some examples, the object may be dynamic, such that it may transform according to contributions from user device(s) 116. In some examples, the object may be modified depending on the outcome of selection module 106. The object may be updated in real-time as additional contributions are transmitted to the session module 102 via the communication session from user device(s) 116. In some examples, the object may be a summation of the contributions (e.g., a total dollar amount, a total token amount, etc.). In some other examples, the object may be a digital object capable of distribution amongst one or more user devices (e.g., a digital item that may be shared among multiple user devices, such as a download, coins, NFT, any combination thereof, or the like).

Contribution module 104 may maintain a database that includes the contributions stored in association with a respective user device. For example, the database may include a record that indicates that Contribution A was made by User Device A and Contribution B was made by User Device B. The database may be structured according to a data structure searchable by session module 102. The database ensures that a record of contributions is maintained after the contributions are combined into the object. Contribution module 104 use the database to determine a proportion of the object that is associated with each contribution. The proportion associated with each contribution may dynamically change in real-time as new contributions are received by session module 102 and contribution module 104. In some examples, if a first user device makes more than one contribution, then the contributions will be combined in the database. The database may be stored in a location accessible to session module 102, such as local storage, cloud-based storage, the managing user device, any combination thereof, or the like.

After a duration of time, contribution module 104 may refuse to accept any additional contributions from user device(s) 116. The duration of time may be determined by the communication network, session module 102, template, any combination thereof, or the like. In some examples, the managing user device may determine the duration of time. The duration of time may be a length of time (e.g., 48 hours, two weeks, one day, etc.), defined by a start time and a length, defined by an end time and a length, defined by one or more events (e.g., when the "n" user devices connect to the communication session, after a predetermined quantity of resources are contributed, when the managing user device decides to end the communication session, detection of particular interaction data, and/or the like), and/or the like. The duration of time may be included in the contribution settings, template settings, and/or session settings and implemented by settings module 114. In some examples, the session module 102 may transmit a notification to user device(s) 116 indicating that the duration of time is about to expire. The notification may occur at a specific time (e.g., 11:55 pm on July 10th) or at a set time before the duration of time is to expire (e.g., 5 minutes before the duration of time expires, one hour before the duration of time expires, etc.). The notification may be managed by default settings associated with the communication session or may be determined by the managing user device. The notification may be a text message, a phone call, a push notification, an email, an alarm, a pop-up, any combination thereof, or the like.

In some examples, the notification may include a request for interaction data. The interaction data may include data from one or more sensors of user device(s) 116 (e.g., accelerometer, gyroscope, camera, microphone, touch-screen, etc.). In some examples, the interaction data may be received from one or more alternative sources, such as motion detectors, external cameras, external microphones, any combination thereof, or the like. The interaction data may include data associated with one or more interactions of a user with a user device, such as web-browsing history, participation in online games, phone calls, text messages, any combination thereof, or the like. In some examples, the interaction data may include data associated with an external source, such as any data received via near-field communication (NFC), Bluetooth transceiver, Wi-Fi transceiver, global positioning system signals, other radio receiver or transceiver, network interface, any combination thereof, or the like. The one or more sensors may capture data that includes, but is not limited to, motion (e.g., moving a user device), gesture (e.g., specific motion patterns or sequences), touch (e.g., interactions with a touch screen, button, microphone, keyboard, mouse, etc.), sound (e.g., speaking, singing, humming, banging on surfaces, clapping, playing music, ultrasound, etc.), phonemes/phrases (e.g., specific patterns of sound or sequences), light (e.g., ambient or directed light, turning lights on/off, dimming lights, changing light color, etc.), light patterns (e.g., certain pre-defined light patterns or sequences), movement (e.g., detecting movement using assistive devices or camera inputs), movement patterns (e.g., pre-defined patterns of movement, like a dance, sporting move, pushups, jumping jacks, etc.), facial attributes (e.g., a state of the eyes, ears, nose, and facial movements like smiling, frowning, etc.), facial patterns (e.g., a sequence of facial attributes, like laughing followed by frowning), object recognition (e.g., detecting specific objects within a video stream, such as a banana or a cat), specific object recognition (e.g., detecting object logos or specific objects), proximity (e.g., detecting proximity of certain objects to the sensor, including Bluetooth, NFC, geofences, etc.), proximity patterns (e.g., a detected object swinging back and forth in a prescribed manner), geophysical attributes (e.g., presence at a specific location, entry/exit from a specific geo-fenced location, speed or rate of travel, not moving, proximity to a physical beacon, etc.), any combination thereof, or the like. A user of user device(s) 116 may generate interaction data by, for example, shaking a user device, yelling into a user device, singing into a user device, making various facial expressions into the camera of a user device, performing specific dance moves or motions within a video frame of a user device, capturing a logo or other image using a camera a user device, bringing an NFC chip within proximity of a user device, connecting to a specific network with a user device, connecting to a Bluetooth device with a user device, performing specific movements on a touchscreen of a user device, etc.

In some examples, the communication session may identify specific interaction data requested. In some examples, the specific interaction data requested may be the same for all user devices associated with the communication session. In some other examples, the specific interaction data may differ based on capabilities of a user device (e.g., some devices may not be equipped with a camera), geolocation of a user device, "level" and/or experience level associated with a user account associated with a user device, may be random or pseudo-randomly assigned to a user device, any combination thereof, or the like. The specific interaction data requested may be determined based on the template, theme, configuration settings, session settings, communication network, managing user device, any combination thereof, or the like. The notification may include an identification of the specific interaction data. For example, the notification may include a message requesting interaction data from a microphone. The communication network may accept interaction data associated with a microphone and discard interaction data associated with other sensors. Alternatively, or additionally, the communication session may include weights and/or biases associated with one or more types of interaction data. The weights may be determined based on the template, theme, configuration settings, session settings, communication network, managing user device, any combination thereof, or the like. For example, a first type of interaction data may be weighted higher by the communication network than a second type of interaction data. In some other examples, the session settings may include instructions for specific interaction data (e.g., an audio segment of a user singing a particular song, an image of a person making a particular face, capturing a particular logo with a camera of the user device, accelerometer and/or gyroscope data representative of a user performing a particular dance move, any combination thereof, or the like). For example, the notification may include a request for interaction data that is comprised of an individual holding a bottle of Coca-Cola™. The specific interaction data request may include a request for a combination of different types of interaction data (e.g., singing a song while holding a bottle of Coca-Cola™).

In some examples, weighting module 112 may receive the interaction data and may determine if a user device of user device(s) 116 has exceeded a threshold, satisfied a condition, matches a requested interaction data, any combination thereof, or the like, by comparing the interaction data to baseline data associated with the communication session. The baseline data may be interaction data referenced by weighting module 112 to analyze interaction data received from user device(s) 116 associated with the request for interaction data. The baseline data may be a file (e.g., an .mp3, .jpeg, .mp4, .mov, .png, etc.), raw interaction data (e.g., raw sensor data associated with stored sensor input), a threshold set by the managing user device (e.g., microphone input should fall within a decibel range), any combination thereof, or the like. Weighting module 112 may analyze the baseline data (e.g., analyze a video, analyze a sound file, analyze an image, etc.) and generate a method of comparing the interaction data to the baseline data. For example, weighting module 112 may compare features of a first dancer in a first video used as the baseline data to features of a second dancer in a second video received as interaction data by mapping the location of the feet of the second dancer compared to the feet of the first dancer.

Weighting module 112 may determine whether interaction data received by a user device corresponds to the specific interaction data requests (e.g., the baseline data) included in the communication session and/or configuration settings. For example, the session settings may include a request for a user singing "Happy Birthday." Weighting module 112 may receive the interaction data from a user device in response to a request and determine if the interaction data includes an audio segment of a user singing "Happy Birthday" by comparing the interaction data to baseline data associated with the request.

In some examples, weighting module 112 may provision one or more machine-learning models determine if the received interaction data matches the requested interaction data. The one or more machine-learning models may be configured to provide natural language processing (e.g., such as a large language model, bi-directional transformers, zero/few shot learners, deep neural networks, etc.), content generation (e.g., using large language models, deep neural networks, generative adversarial networks, etc.), single variate or multivariate classifiers (e.g., k-nearest neighbors, random forest, logarithmic regression, decision trees, support vector machines, gradient decent, etc.), image processing (e.g., using deep neural networks, convolutional neural networks, etc.), sequenced data processors (e.g., such as recurrent neural networks, etc. capable of processing datasets organized according to a taxonomic sequence), and/or the like. For example, a first machine-learning model may receive interaction data and session settings and determine if the interaction data corresponds to the requested interaction data identified by the session settings.

Examples of machine-learning models include algorithms such as k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. In some instances, the machine-learning model may be trained using training data received and/or derived from data previously received by session module 102. In some examples, the first machine-learning model may be trained using training data received and/or derived from interaction data received from user device(s) 116. In some instances, the first machine-learning model may be trained using data sources associated with other communication sessions (e.g., such as historical communication sessions, etc.). The first machine-learning model can be trained using supervised training, supervised training, semi-supervised training, reinforcement training, combinations thereof, or the like.

In some examples, weighting module 112 may define a score for the interaction data received from each user device of a communication session using the first machine-learning model and/or another method. In some examples, the score may be determined from interaction data received from a second user device associated with a user device of the communication session. For example, the second user device may be a smartwatch, an external microphone, an external camera, a fitness tracker, a heart rate monitor, any combination thereof, or the like. The second user device may transmit the interaction data to the user device of the communication session, and the user device may forward the interaction data from the second user device to weighting module 112. In some other examples, the second user device may transmit the interaction data directly to the weighting module. The score may indicate a degree in which the received interaction data matches the requested interaction data. Weighting module 112 may compare received interaction data with a reference interaction data associated with the interaction data request. Weighting module 112 may also compare a time associated with received interaction data (e.g., a first user device that performs an interaction faster than a second user device may be weighted differently). In some examples, the interaction data request associated with the communication session may also be associated with one or more thresholds, tolerances, and/or error rates. As an illustrative example, an interaction data request of a notification transmitted to a user device may identify a particular dance move. The user may capture a video segment of the user performing the dance move. Weighting module 112 may analyze the video segment and, using a tolerance measure associated with the interaction data request, may generate a score based on how the received interaction data (e.g., representing the user performing the dance move) matches reference interaction data (e.g., interaction data representing a user of the managing user device performing the dance move, interaction data representing a professional dancer performing the dance move, interaction data generated by the communication network representing a simulated user performing the dance move, etc.). Tolerances may be used to allow for some deviation between the received interaction data and the reference interaction data.

Weighting module 112 may generate a score for each user device that transmits interaction data. The scores may be stored in a location accessible by session module 102, such as an internal database, external database, cloud storage location, local memory, any combination thereof, or the like. In some examples, the scores may be dynamically updated according to additional input received from user device(s) 116 associated with the communication session. A respective score associated with a user device may increase, decrease, and/or stay the same based on input receive subsequent to the original score generation. For example, the original score may be generated according to a first set of camera input from a first user device. The original score may be modified according to a second set of microphone input from the first user device received subsequent to the first set of camera input, generating a modified score. Weighting module 112 may update the score associated with the first user device with the modified score. At the conclusion of the duration of time associated with the communication session, the weighting module 112 may "freeze" the scores associated with user device(s) 116 associated with the communication session and no longer dynamically modify the scores according to additional sensor input. In some examples, user device(s) 116 associated with the communication session may access the sensor data and associated scores after the expiration of the duration of time. User device(s) 116 may provide feedback on the scores associated with the interaction data, which may include flagging errors, transmitting a message to a user device associated with specific interaction data, transmitting an indication of interaction with interaction data (e.g., "liking," "commenting," etc.), etc. The feedback, the interaction data, and other relevant data may be compiled into a training dataset and used to further train the first machine-learning model.

Weighting module 112 may sort the scores based on value, interaction data used to generate the score (e.g., the quantity of interaction data received from one or more sensors associated with a user device, etc.), any combination thereof, or the like. Weighting module 112 may store the scores as an ordered list. In some examples, the scores may be sorted as they are generated (and/or updated) by the weighting module 112 (e.g., as the interaction data is received from each user device before the expiration of the duration of time). In those examples, the order of the scores may change as additional interaction data is received before the expiration of the duration of time. In some other examples, the scores may be sorted after the conclusion of the duration of time and the scores are finalized and/or "frozen."

Weighting module 112 may select identifiers associated with the ordered list of user device(s) 116. The identifiers may be references to user device(s) 116 (e.g., a serial number, a name, an IP address, a nickname, a MAC address, a username, any combination thereof, or the like) corresponding to the scores. To provide user devices associated with the communication session with a bias and/or weight based on a respective score associated with the individual user devices, some user devices of user device(s) 116 may be associated with multiple instances of a respective identifier within a weighted list of identifiers. The identifiers associated with a user device may be identical and reference the user device (e.g., the 15 identifiers associated with the first user device may be identical and distinct from the 9 identical identifiers associated with the second user device). In some examples, the identifiers associated with the user device may not be identical but may maintain a reference to the user device and maintain a distinction from other identifiers (e.g., a first identifier includes a MAC address, and a second identifier includes an IP address, where the MAC address and the IP address are associated with the same user device). Weighting module 112 may assign a unique number (e.g., an integer) to each identifier of the weighted list. In some examples, the unique numbers may be assigned according to a position of an identifier in the list. This process may generate a numbered list of identifiers. Weighting module 112 may transmit the weighted list to random number generator 110.

Random number generator 110 may randomly assign user device(s) 116 associated with the communication session to a first group or a second group using the second ordered list. Random number generator 110 may use a seed value to initialize an internal state, which then serves as the starting point for generating a sequence of pseudo-random numbers. Random number generator 110 may apply a deterministic algorithm (e.g., such as linear congruential functions, a cryptographic hash functions, combinations thereof, and/or the like) to produce a series of pseudo-random numbers. Seed mixer 108 may generate the seed value using the interaction data from one or more sensors of user device(s) 116.

At seed mixer 108, the interaction data associated with a time period and a user device may be transformed into an initial seed value. Initial seed values associated with user device(s) 116 may be combined into a combined seed for use in random number generator 110. To generate the initial seeds, the interaction data may be received (e.g., at a user device and/or session module 102) in one or more forms (e.g., analog signals, digital signals, serial communications, parallel communications, pulse width modulation, sound waves, optic signals, wireless communications, frequency signals, capacitive or resistive changes, etc.) and may be converted into a numeric array and/or a string value. For example, interaction data from accelerometers or gyroscopes may include values in each of one or more spatial dimensions (X-axis, Y-axis, and Z-axis). The values of the one or more spatial dimensions can be represented as an array of three floating point values, or a single string value. In some examples, session module 102 may determine an algorithm applicable to each type of interaction data (e.g., data from accelerometer, audio segment from a microphone, image data from a camera, etc.) that may transform the data accordingly into a uniform representation of numeric arrays and/or strings. In some examples, the data may be processed at a user device (e.g., user device(s) 116) and the uniform representation of numeric arrays and/or strings may be transmitted to session module 102.

The numeric arrays and/or strings may be aggregated (e.g., summed, averaged, concatenated, etc.) into an initial seed using a hashing function (e.g., MD5, HMAC, AES-256, etc.). In some examples, session module 102 and/or user device(s) 116 may provision one or more machine-learning models to generate the initial seed. The one or more machine-learning models may be configured to generate a numeric array and/or string value of the interaction data and/or aggregate multiple numeric arrays and/or strings into the initial seed. Alternatively, or additionally, the one or more machine-learning models may be configured to transform interaction data (in real time) to generate the initial seed.

In some examples, the initial seeds associated with individual user devices of user device(s) 116 may be combined to generate a single numeric array and/or string value, or the combined seed. In some examples, session module 102 may, in lieu of generating initial seeds associated with individual user devices associated with the communication session, may aggregate interaction data received from a plurality of user devices associated with the communication session using a hashing function to generate the combined seed. In some examples, the one or more machine-learning models may may be configured to perform any of the functionality described herein, including combining the sensor output data, generating a single numeric array and/or string value based on a plurality of numeric arrays and/or string values, generating a single numeric array and/or string value based on a plurality of interaction data, any combination thereof, or the like. The combined seed generated by seed mixer 108 based on the interaction data may be transmitted to random number generator 110 at the conclusion of the duration of time associated with the communication session.

Session module 102 may, using the combined seed value and random number generator 110, assign user device(s) 116 to the first group, the second group, etc. In some examples, the first group and the second group may be of equal size (e.g., the first group is assigned 50 user devices and the second group is assigned 50 user devices), near-equal size (e.g., in instances when the number of user devices associated with an odd number, it may be impracticable to split the user devices equally, thus the first group may be assigned 38 user devices while the second group may be assigned 39 user devices), or of unequal size (e.g., the first group is assigned 10 user devices and the second group is assigned 30 user devices). In some other examples, session module 102 may not split user device(s) 116 into two groups, and may include user device(s) 116 in one single group. The number of user devices assigned to the first group and the second group may be determined by a proportion indicated by settings module 114 (e.g., 50% and 50%, 30% and 70%, 25% and 75%, etc.), where the proportion may be approximately achieved based on the number of user devices associated with the communication session (e.g., 25% of 50 user devices may be rounded to the nearest whole number, 13), the quantity of resources contributed by user device(s) 116, the quantity of instances user device(s) 116 and/or each user devices contributed resources, combinations thereof, and/or the like. In some examples, the number of user devices assigned to the first group and the second group may be determined by a set number associated with a group (e.g., the first group may always be assigned 5 user devices, despite the total number of user devices associated with the communication session).

Random number generator 110 may assign user device(s) 116 to more than two groups (e.g., a third group, a fourth group, an "n" group, where "n" is an integer greater than 0). The order of which group is populated first may be determined by settings module 114, default settings associated with session module 102, input from managing user device, any combination thereof, or the like. The group currently being assigned user devices may be considered the "active" group, while "complete" groups may already be populated and "pending" groups are waiting to be populated. For example, device group 120 may be assigned an associated number of user devices (e.g., 5 user devices, 50% of the user devices associated with the communication session, etc.) first, then device group 122 may be assigned an associated number of user devices (e.g., the remainder of user devices, 50% of the user devices associated with the communication session that are not assigned to device group 120, any combination thereof, or the like).

To assign the user device(s) 116 to the first group, second group, etc., random number generator 110 may receive the weighted list associated with the user device(s) 116 from weighting module 112. Random number generator 110 may generate a pseudo-random integer based on the combined seed that is between 1 and the length of weighted list. For example, random number generator 110 may output number 14, which may correspond to 14th identifier of the weighted list. A selected identifier of the weighted list that is associated with the number generated by random number generator 110 may be assigned to the active group (e.g., first group, second group, device group 120, device group 122, etc.), based on the settings associated with the communication session. For example, Identifier A may be associated with User Device A, thus User Device A may be assigned to a first group. To ensure that a user device is not assigned to multiple groups (or the same group multiple times), the session module 102 removes the identifiers within the weighted list associated with a user device once the user device is assigned to a group. For example, identifiers associated with User Device A may be removed from the weighted list before another identifier is selected by random number generator 110. The weighted list may be renumbered after the purged entries are removed, and the random number generator 110 may generate a second pseudo-random number using a new combined seed. The new combined seed may be generated from the same process as the combined seed. Alternatively, the new combined seed may be generated by processing the combined seed using a predetermined algorithm associated with session module 102 and/or settings module 114, random selection from a database of historic combined seeds calculated from prior communication sessions, determined using interaction data from a different time period than combined seed, any combination thereof, or the like. The process may be repeated until the active group has been fully populated. Then, the active group may become a complete group, and the remaining user devices may be assigned to the next active group (e.g., device group 122). Alternatively, if more than two groups are utilized, user devices may be assigned to the next pending group using a similar, if not identical, process.

In some examples, the entirety or a portion of the object may be allocated to a device group (e.g., device group 120), the managing user device, and/or an enterprise associated with the communication network. In some examples, a respective withhold value may be associated with the managing user device and/or the enterprise associated with the communication network may be determined by configuration settings associated with the communication session. For example, 80% of the object may be allocated to device group 120, 10% may be allocated to the managing user device associated with the communication session, and 10% may be allocated to the enterprise associated with the communication network. In some examples, the portions may be percentages or a predetermined values (e.g., $100, 10 tokens, etc.). Session module 102 may determine a portion to be allocated to the managing user device and/or the enterprise and may allocate the respective portion accordingly (e.g., may credit an account associated with the managing user device, transmit a portion of the object to a central server associated with the enterprise, notify the managing user device of the allocation, any combination thereof, or the like). The remainder of the object that may be allocated to device group 120 may be a group object. As mentioned above, contribution module 104 may maintain a database that includes the contributions made by user device(s) 116 stored in association with a respective user device. Selection module 106 may query the database for the contributions associated with user device(s) 116 assigned to device group 120. Session module 102 may allocate a value associated with group object to the user devices of device group 120 proportionally based on the contributions associated with user device(s) 116 assigned to device group 120. For example, if User Device A contributes 10 resources, and User Device B contributes 20 resources, and a value associated with the group object is 100, then User Device A may be associated with 10% and User Device B may be associated with 20%.

Selection module 106 and/or contribution module 104 may distribute portions of the group object to user device(s) 116 associated with device group 120 according to a respective proportion. In some examples, a second object may be distributed to device group 120 and/or device group 122. The second object may not be associated with the group object.

Figure 2:
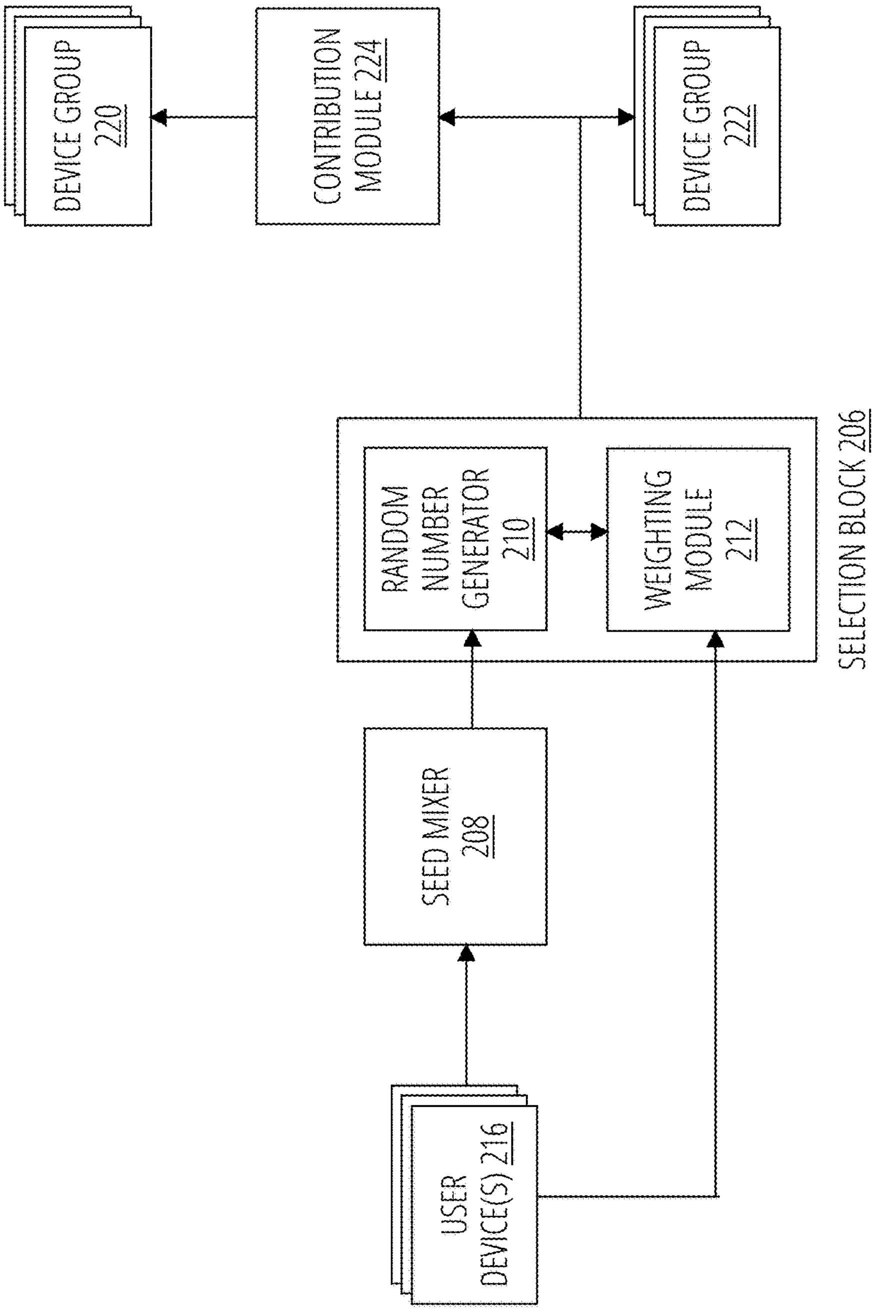
FIG. 2 illustrates an example diagram of a selection block of the session module according to some aspects of the present disclosure.

FIG. 2 illustrates an example diagram of a selection block of the session module according to some aspects of the present disclosure. The selection block 206 may be associated with a communication session facilitated between user device(s) 216. In some examples, user device(s) 216 may transmit resources (e.g., "a contribution) to the session module, which may be stored in a database accessible by contribution module 224. Contributions may be accepted for a duration of time associated with the communication session. In some examples, immediately prior to the expiration of the duration of time associated with the communication session, user device(s) 216 may receive a request for interaction data (e.g., camera data, accelerometer data, microphone data, GPS data, biometric data, any combination thereof, or the like) via a notification transmitted by the session module. As mentioned above in FIG. 1, seed mixer 208 may receive the interaction data from user device(s) 216. The interaction data may include data from one or more sensors of user device(s) 216 (e.g., accelerometer, gyroscope, camera, microphone, touchscreen, biometric sensors, wearable devices, etc.). In some examples, the interaction data may include data associated with an external source, such as any data received via near-field communication (NFC), Bluetooth transceiver, Wi-Fi transceiver, global positioning system signals, other radio receiver or transceiver, network interface, any combination thereof, or the like. The one or more sensors may capture data that includes, but is not limited to, motion (e.g., moving a user device, head motion data, etc.), gesture (e.g., specific motion patterns or sequences), sound (e.g., speaking, singing, humming, banging on surfaces, clapping, playing music, ultrasound, etc.), phonemes/phrases (e.g., specific patterns of sound or sequences), light (e.g., ambient or directed light, turning lights on/off, dimming lights, changing light color, etc.), light patterns (e.g., certain pre-defined light patterns or sequences), movement (e.g., detecting movement using assistive devices or camera inputs), movement patterns (e.g., pre-defined patterns of movement, like a dance or sporting move), facial attributes (e.g., a state of the eyes, ears, nose, and facial movements like smiling, frowning, etc.), facial patterns (e.g., a sequence of facial attributes, like laughing followed by frowning), object recognition (e.g., detecting specific objects within a video stream, such as a banana or a cat), specific object recognition (e.g., detecting object logos or specific objects), proximity (e.g., detecting proximity of certain objects to the sensor, including Bluetooth, NFC, or other systems where proximate objects and their data can be detected), proximity patterns (e.g., a detected object swinging back and forth in a prescribed manner), geophysical attributes (e.g., presence at a specific location, entry/exit from a specific geo-fenced location, speed or rate of travel, not moving, etc.), any combination thereof, or the like. A user of user device(s) 216 may generate interaction data by, for example, shaking a user device, yelling into a user device, singing into a user device, moving their head while wearing headphones equipped with sensors, elevating a heart rate as measured by a wearable device with biometric sensors, playing an online game, performing an interactive task, making various facial expressions into the camera of a user device, performing specific dance moves or motions within a video frame of a user device, placing a logo or other image in the video frame of a user device, bringing an NFC chip within proximity of a user device, connecting to a specific network with a user device, connecting to a Bluetooth device with a user device, performing specific movements on a touchscreen of a user device, etc.

At seed mixer 208, the interaction data associated with a time period and a user device may be transformed into an initial seed. Initial seed values associated with user device(s) 216 may be combined into a combined seed for use in random number generator 210. The interaction data may be received (e.g., at a user device and/or the session module) in one or more forms (e.g., analog signals, digital signals, serial communications, parallel communications, pulse width modulation, sound waves, optic signals, wireless communications, frequency signals, capacitive or resistive changes, etc.) and may be converted into a numeric array and/or a string value. For example, interaction data from accelerometers or gyroscopes may include values in each of the one or more spatial dimensions (X-axis, Y-axis, and Z-axis). The values of the one or more spatial dimensions can be represented as an array of three floating point values, or a single string value. In some examples, the session module (e.g., session module 102) may determine an algorithm applicable to each variety of sensor output (e.g., data from accelerometer, data from microphone, image data from a camera, etc.) that may transform the data accordingly into a uniform representation of numeric arrays and/or strings. In some examples, the data may be processed at a user device (e.g., user device(s) 216) and the uniform representation of numeric arrays and/or strings may be transmitted to the session module.

The array of string representation may be aggregated (e.g., summed, averaged, concatenated, etc.) into an initial seed using a hashing function (e.g., MD5, HMAC, AES-256, etc.). In some examples, the session module and/or user device(s) 216 may provision one or more machine-learning models to generate the initial seed. The one or more machine-learning models may be configured to generate a numeric array and/or string value of the interaction data and/or aggregate multiple numeric arrays and/or strings into the initial seed.

In some examples, the initial seeds associated with individual user devices of user device(s) 216 may be combined to generate a single numeric array and/or string value, or the combined seed. In some examples, the session module may, in lieu of generating initial seeds associated with individual user devices associated with the communication session, may aggregate interaction data received from a plurality of user devices associated with the communication session using a hashing function to generate the combined seed. In some examples, the one or more machine-learning models may be configured to perform any of the functionality described herein, including combining the sensor output data, generating a single numeric array and/or string value based on a plurality of numeric arrays and/or string values, generating a single numeric array and/or string value based on a plurality of interaction data, any combination thereof, or the like. The combined seed generated by seed mixer 208 based on the interaction data may be transmitted to random number generator 210 at the conclusion of the duration of time associated with the communication session.

In some examples, weighting module 212 may receive the interaction data and may determine if a user device of user device(s) 216 has exceeded a threshold, satisfied a condition, matched a requested interaction data, any combination thereof, or the like, by comparing the interaction data to baseline data associated with the communication session. The baseline data may be sensor data referenced by weighting module 212 to analyze interaction data received from user device(s) 216 associated with the request for interaction data. The baseline data may be a file (e.g., an .mp3, .jpeg, .mp4, .mov, .png, etc.), raw interaction data (e.g., raw sensor data associated with stored sensor input), a threshold set by the managing user device (e.g., microphone input should fall within a decibel range), any combination thereof, or the like. Weighting module 212 may analyze the baseline data (e.g., analyze a video, analyze a sound file, analyze an image, etc.) and generate a method of comparing the interaction data to the baseline data. For example, weighting module 212 may compare features of a first dancer in a first video used as the baseline data to features of a second dancer in a second video received as interaction data by mapping the location of the feet of the second dancer compared to the feet of the first dancer.

Weighting module 212 may determine whether interaction data received by a user device corresponds to the specific interaction data requests (e.g., the baseline data) included in the communication session and/or configuration settings. For example, the session settings may include a request for a user singing "Happy Birthday." Weighting module 212 may receive the interaction data from a user device in response to a request and determine if the interaction data includes an audio segment of a user singing "Happy Birthday" by comparing the interaction data to baseline data associated with the request.

In some examples, weighting module 212 may provision one or more machine-learning models determine if the received interaction data matches the requested interaction data. The one or more machine-learning models may be configured to provide natural language processing (e.g., such as a large language model, bi-directional transformers, zero/few shot learners, deep neural networks, etc.), content generation (e.g., using large language models, deep neural networks, generative adversarial networks, etc.), single variate or multivariate classifiers (e.g., k-nearest neighbors, random forest, logarithmic regression, decision trees, support vector machines, gradient decent, etc.), image processing (e.g., using deep neural networks, convolutional neural networks, etc.), sequenced data processors (e.g., such as recurrent neural networks, etc. capable of processing datasets organized according to a taxonomic sequence), and/or the like. For example, a first machine-learning model may receive interaction data and session settings and determine if the interaction data corresponds to the requested interaction data identified by the session settings.

In some examples, weighting module 212 may define a score for the interaction data received from each user device of a communication session using the first machine-learning model and/or another method. The score may indicate a degree in which the received interaction data matches the requested interaction data. Weighting module 212 may compare received interaction data with a reference interaction data associated with the interaction data request. In some examples, the interaction data request associated with the communication session may also be associated with one or more thresholds, tolerances, and/or error rates. As an illustrative example, an interaction data request of a notification transmitted to a user device may identify a particular dance move. The user may capture a video segment of the user performing the dance move. Weighting module 212 may analyze the video segment and, using a tolerance measure associated with the interaction data request, may generate a score based on how the received interaction data (e.g., representing the user performing the dance move) matches reference interaction data (e.g., interaction data representing a user of the managing user device performing the dance move, interaction data representing a professional dancer performing the dance move, interaction data generated by the communication network representing a simulated user performing the dance move, etc.). Tolerances may be used to allow for some deviation between the received interaction data and the reference interaction data.

Weighting module 212 may generate a score for each user device that transmits interaction data. The scores may be stored in a location accessible by session module, such as an internal database, external database, cloud storage location, local memory, any combination thereof, or the like. In some examples, the scores may be dynamically updated according to additional input received from user device(s) 216 associated with the communication session. A respective score associated with a user device may increase, decrease, and/or stay the same based on input receive subsequent to the original score generation. For example, the original score may be generated according to a first set of camera input from a first user device. The original score may be modified according to a second set of microphone input from the first user device received subsequent to the first set of camera input, generating a modified score. Weighting module 212 may update the score associated with the first user device with the modified score. At the conclusion of the duration of time associated with the communication session, the weighting module 212 may "freeze" the scores associated with user device(s) 216 associated with the communication session and no longer dynamically modify the scores according to additional sensor input.

Weighting module 212 may sort the scores based on value, interaction data used to generate the score (e.g., the quantity of interaction data received from one or more sensors associated with a user device, etc.), any combination thereof, or the like. Weighting module 212 may store the scores as an ordered list. In some examples, the scores may be sorted as they are generated (and/or updated) by the weighting module 212 (e.g., as the interaction data is received from each user device before the expiration of the duration of time). In those examples, the order of the scores may change as additional interaction data is received before the expiration of the duration of time. In some other examples, the scores may be sorted after the conclusion of the duration of time and the scores are finalized and/or "frozen."

Weighting module 212 may select identifiers associated with the ordered list of user device(s) 216. The identifiers may be references to user device(s) 216 (e.g., a serial number, a name, an IP address, a nickname, a MAC address, a username, any combination thereof, or the like) corresponding to the scores. To provide user devices associated with the communication session with a bias and/or weight based on a respective score associated with the individual user devices, some user devices of user device(s) 216 may be associated with multiple instances of a respective identifier within a weighted list of identifiers. The identifiers associated with a user device may be identical and reference the user device (e.g., the 15 identifiers associated with the first user device may be identical and distinct from the 9 identical identifiers associated with the second user device). In some examples, the identifiers associated with the user device may not be identical but may maintain a reference to the user device and maintain a distinction from other identifiers (e.g., a first identifier includes a MAC address, and a second identifier includes an IP address, where the MAC address and the IP address are associated with the same user device). Weighting module 212 may assign a unique number (e.g., an integer) to each identifier of the weighted list. In some examples, the unique numbers may be assigned according to a position of an identifier in the list. This process may generate a numbered list of identifiers.

Weighting module 212 may transmit the weighted list to random number generator 210. To assign the user device(s) 216 to the first group, second group, etc., random number generator 210 may receive the weighted list associated with the user device(s) 216 from weighting module 212. Random number generator 210 may assign user device(s) 216 to more than two groups (e.g., a third group, a fourth group, an "n" group, where "n" is an integer greater than 0).

Random number generator 210 may generate a pseudo-random integer based on the combined seed that is between 1 and the length of weighted list. For example, random number generator 210 may output number 14, which may correspond to 14th identifier of the weighted list. A selected identifier of the weighted list that is associated with the number generated by random number generator 210 may be assigned to the active group (e.g., first group, second group, device group 220, device group 222, etc.), based on the settings associated with the communication session. For example, Identifier A may be associated with User Device A, thus User Device A may be assigned to a first group. To ensure that a user device is not assigned to multiple groups (or the same group multiple times), the session module removes the identifiers within the weighted list associated with a user device once the user device is assigned to a group. For example, identifiers associated with User Device A may be removed from the weighted list before another identifier is selected by random number generator 210. The weighted list may be renumbered after the purged entries are removed, and the random number generator 210 may generate a second pseudo-random number using a new combined seed. The new combined seed may be generated from the same process as the combined seed.

Alternatively, the new combined seed may be generated by processing the combined seed using a predetermined algorithm associated with the session module, random selection from a database of historic combined seeds calculated from prior communication sessions, determined using interaction data from a different time period than combined seed, any combination thereof, or the like. The process may be repeated until the active group has been fully populated. Then, the active group may become a complete group, and the remaining user devices may be assigned to the next active group (e.g., device group 222). Alternatively, if more than two groups are utilized, user devices may be assigned to the next pending group using a similar, if not identical, process.

In some examples, the entirety or a portion of the object may be allocated to a device group (e.g., device group 220), the managing user device, and/or an enterprise associated with the communication network. For example, 80% of the object may be allocated to device group 220, 10% may be allocated to the managing user device associated with the communication session, and 10% may be allocated to the enterprise associated with the communication network. In some examples, the portions may be percentages or a predetermined values (e.g., $100, 10 tokens, etc.). The session module may determine a portion to be allocated to the managing user device and/or the enterprise and may allocate the respective portion accordingly (e.g., may credit an account associated with the managing user device, transmit a portion of the object to a central server associated with the enterprise, notify the managing user device of the allocation, any combination thereof, or the like). The remainder of the object that may be allocated to device group 220 may be a group object. As mentioned above, contribution module 204 may maintain a database that includes the contributions made by user device(s) 216 stored in association with a respective user device. Selection module 206 may query the database for the contributions associated with user device(s) 216 assigned to device group 220. Session module 202 may allocate a value associated with group object to the user devices of device group 220 proportionally based on the contributions associated with user device(s) 216 assigned to device group 220. For example, if User Device A contributes 10 resources, and User Device B contributes 20 resources, and a value associated with the group object is 100, then User Device A may be associated with 10% and User Device B may be associated with 20%. Selection module 206 and/or contribution module 204 may distribute portions of the group object to user device(s) 216 associated with device group 220 according to a respective proportion.

Figure 3:
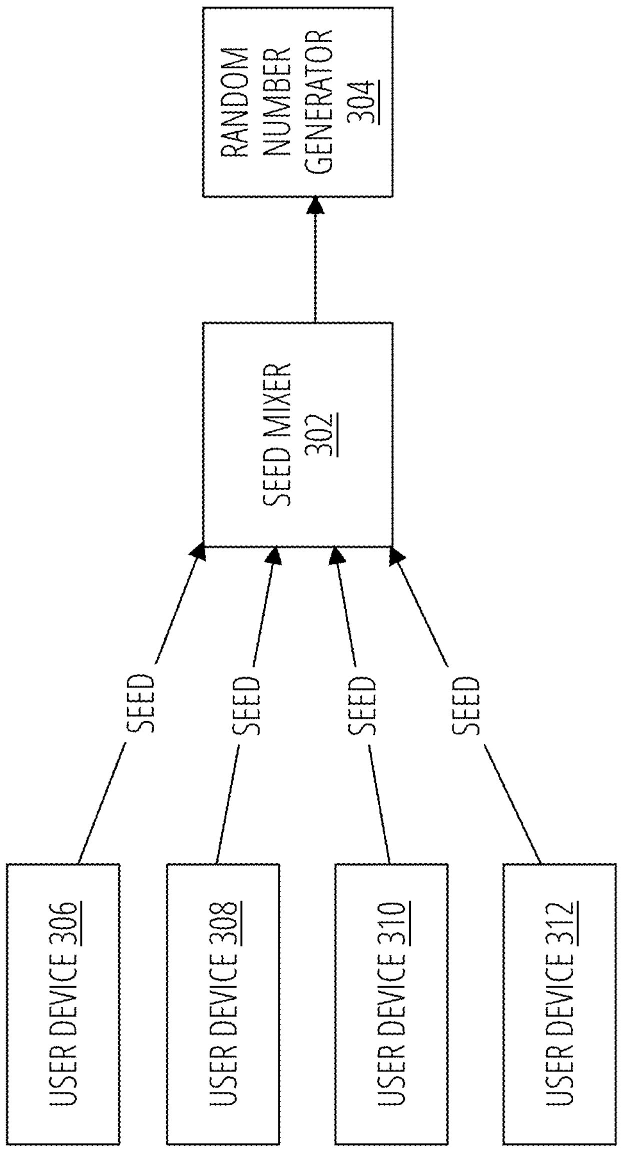
FIG. 3 illustrates an example diagram of a random number generator of the session module according to some aspects of the present disclosure.

FIG. 3 illustrates an example diagram of a random number generator of the session module according to some aspects of the present disclosure. Seed mixer 302 may receive interaction data from one or more user devices associated with a communication session (e.g., user device 306, user device 308, user device 310, and user device 312)

and may generate one or more initial seeds associated with respective interaction data. For example, interaction data from user device 306 may be used to generate a respective initial seed. The initial seeds may be transmitted to random number generator 304 to determine a combined seed, which may be a value generated by random number generator 304 that incorporates the input of the initial seeds.

To generate the initial seeds, in some examples, at seed mixer 302, the interaction data associated with a time period may be transmitted as interaction data by a user device for use in random number generator 304. The interaction data may be transmitted in one or more forms (e.g., derivatives of interaction data, analog signals, digital signals, serial communications, parallel communications, pulse width modulation, sound waves, optic signals, wireless communications, frequency signals, capacitive or resistive changes, etc.) and may be converted into a numeric array and/or a string value at session module 102 (or, in some examples, at the user device) (as described in FIG. 1). For example, interaction data may be a motion value involving X, Y, and Z coordinates and can be represented as an array of three floating point values, or a single string value. The interaction data may then be transformed into an initial seed using a hashing function (e.g., MD5, HMAC, AES-256, etc.). In some examples, seed mixer 302 may provision one or more machine-learning models to enable any of the extended functionality. The one or more machine-learning models may be configured to transform sensor input to provide real-time transformation of the data to generate an initial seed.

Seed mixer 302 may receive one or more initial seeds from one or more user devices associated with a communication session. In some examples, the initial seeds may be combined to generate a single numeric array and/or string value as a combined seed. In some examples, the one or more machine-learning models may may be configured to perform any of the functionality described herein, including processing the sensor input data, combining the initial seeds, any combination thereof, or the like. The combined seed generated by seed mixer 302 based on the sensor input data and/or initial seeds may be transmitted to random number generator 304 after the passing of the duration of time associated with the communication session.

Figure 4:
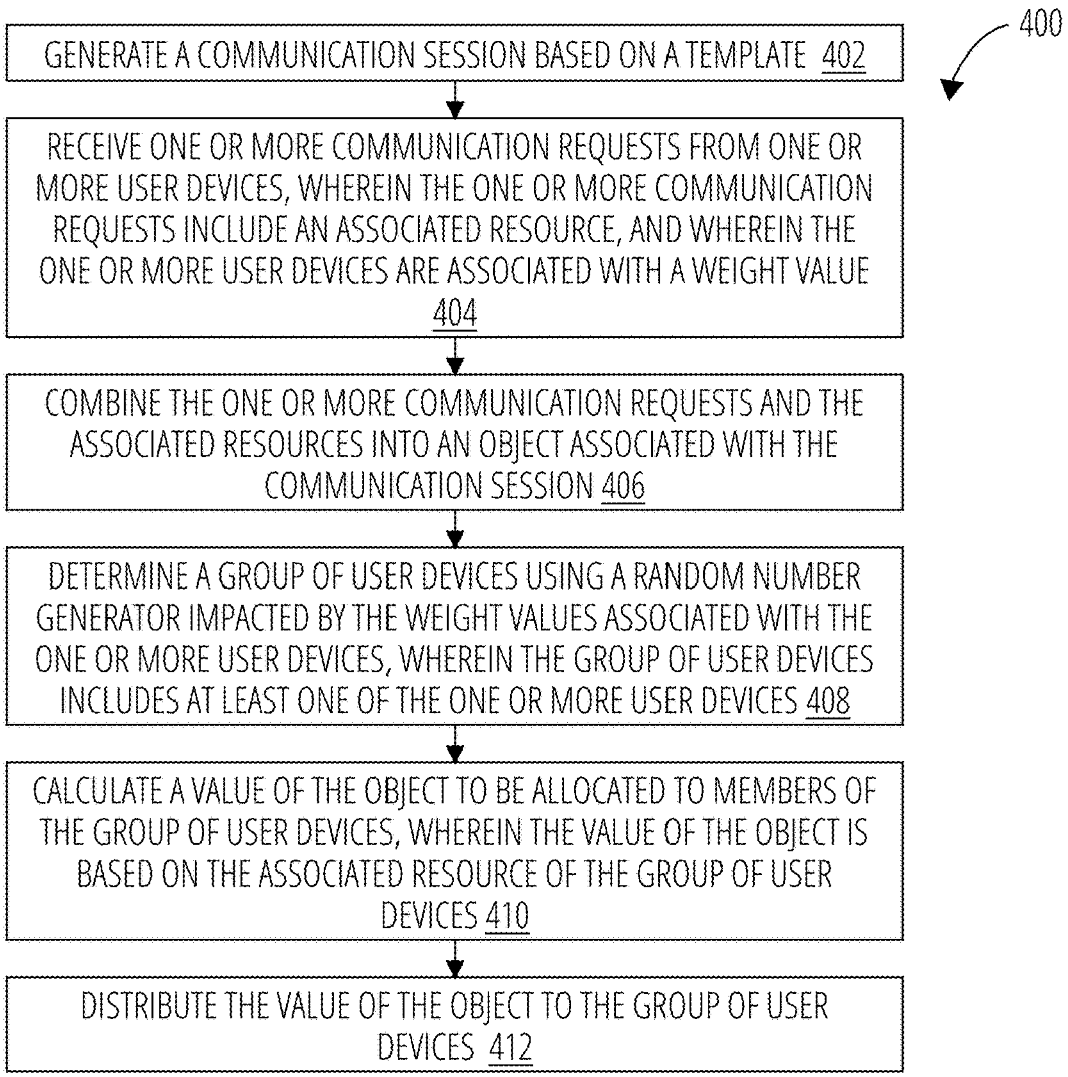
FIG. 4 illustrates an example flowchart for facilitating a communication session with a session module according to some aspects of the present disclosure.

FIG. 4 illustrates an example flowchart for facilitating a communication session with a session module according to some aspects of the present disclosure. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

In block 402, a session module may generate a communication session. A first user device may transmit a request to the session module to initiate a communication session. The first user device that requests initiation of the communication session may be referred to as a managing user device. The request may include configuration settings associated with the communication session, such as, but not limited to, a template, session settings, user device rules (e.g., age limits, geographical restrictions, etc.), resource limitations (e.g., resource types, resource amounts, a minimum and/or maximum resource value, etc.), privacy settings (e.g., "by invite only" session, public session, encryption algorithm, etc.), a start time and/or end time of the communication session, combinations thereof, or the like. The configuration settings for a communication session may be implemented by a settings module.

The session module may then instantiate a new communication session for the managing user device. The communication session may be configured by the settings module according to the configuration settings included within the request to initiate the communication session. In some examples, if a template is not included in the configuration settings, the communication session may generate the template based on the request (e.g., using a default template associated with the communication network). In some other examples, the communication session may load the template from a database of templates. The database of templates may include templates generated during previous communication session, templates generated by user devices (e.g., referred to as creating user devices, etc.), automatically generated templates (e.g., procedurally generated templates, etc.), combinations thereof, and/or the like. The database may be searchable by managing devices and/or the communication network.

In block 404, the session module may receive one or more communication requests from one or more user devices, wherein the one or more communication requests include an associated resource, and wherein the one or more user devices are associated with a weight value. In some examples, the managing user device may invite the one or more user devices to connect to the communication session. In some other examples, the communication session may be published in a table with other active communication sessions connected to a communication network, and the one or more user devices may request to join the communication session with a communication request. In some examples, the one or more communication requests may include an associated resource (e.g., "a contribution"). The contribution may be associated with a value. In some examples, the contribution may be monetary. A user device may not be required to make a contribution when joining a communication session. The weight value may be determined by interaction data received from the one or more user devices. The interaction data may be used to modify a likelihood (e.g., bias) that the communication network will allocate some or all of the object to a particular user device or group of user devices. For example, the communication may be more likely to allocate resources to a user device within the communication session if the user device generates a specific type of interaction data (e.g., doing a particular dance move, making a funny face, shaking the user device, any combination thereof, or the like).

In block 406, the session module may combine the one or more communication requests and the associated resources into an object associated with the communication session. The session module may receive the contributions from the one or more user devices and combine the contributions into one object associated with the communication session. The contributions may be transformed, modified, summed, scaled, any combination thereof, or the like, to generate the object. In some examples, the object may be dynamic, such that it may transform according to contributions from the one or more user devices. In some examples, the object may be modified depending on the outcome of the selection module. The object may be updated in real-time as additional contributions are transmitted to the session module via the communication session from the one or more user devices. In some examples, the object may be a summation of the contributions (e.g., a total dollar amount, a total token amount, etc.). In some other examples, the object may be a digital object capable of distribution amongst one or more user devices (e.g., a digital item that may be shared among multiple user devices, such as a download, coins, NFT, any combination thereof, or the like).

In block 408, the session module may determine an impacted group of user devices using a random number generator biased by the weight values associated with the one or more user devices, wherein the group of user devices includes at least one of the one or more user devices. The random number generator may assign the group of user devices to a first group using a seed generated from the interaction data. In some examples, the weight values associated with the one or more user devices may impact the likelihood of selection for a particular group (e.g., the first group) associated with the communication session.

In block 410, the session module may derive a value of the object to be allocated to user devices of the impacted group, wherein the value of the object is based on the associated resources. The calculation may be based on a proportion of a contribution associated with a user device compared to a summation of one or more contributions associated with one or more other user devices (e.g., the object, a summation of the contributions associated with a particular group of user devices, any combination thereof, or the like).

In block 412, the session module may allocate a quantity of resources corresponding to the value of the object to the user devices of the impacted group.

Figure 5:
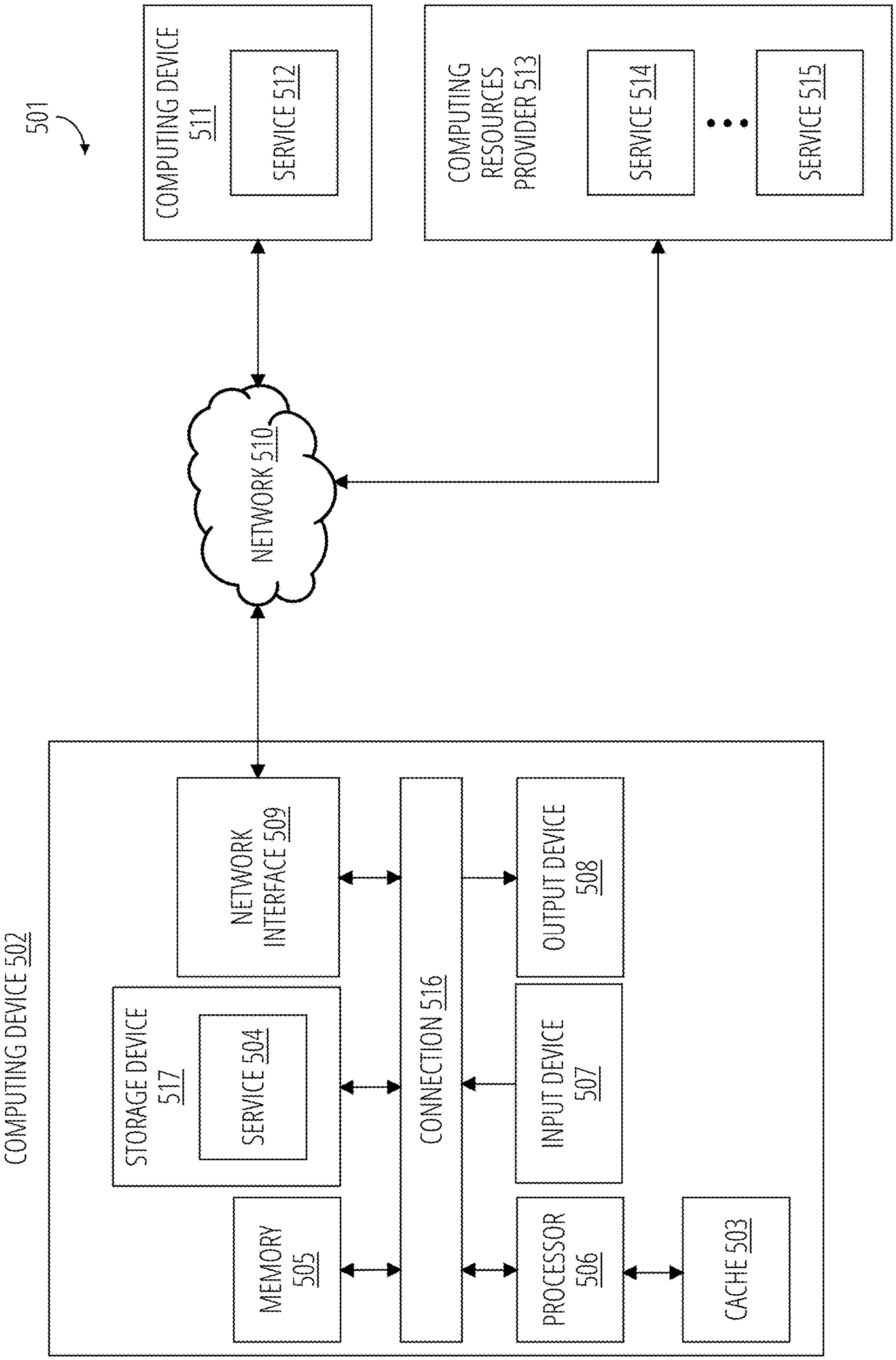
FIG. 5 illustrates an example computing device capable of executing the session module and any other associated components according to some aspects of the present disclosure.

FIG. 5 illustrates an example computing device capable of executing the session module and any other associated components according to some aspects of the present disclosure. This may include a computing system architecture 501, including various components in electrical communication with each other. The example computing system architecture 501 illustrated in FIG. 5 includes a computing device 502, which has various components in electrical communication with each other using a connection 516, such as a bus, in accordance with some implementations. The example computing system architecture 501 includes a processor 506 that is in electrical communication with various system components, using the connection 516, and including the system memory 505. In some examples, the system memory 505 includes read-only memory (ROM), random-access memory (RAM), and other such memory technologies including, but not limited to, those described herein. In some examples, the example computing system architecture 501 includes a cache 503 of high-speed memory connected directly with, in close proximity to, or integrated as part of the processor 506. The system architecture 501 can copy data from the memory 505 and/or the storage device 517 to the cache 503 for quick access by the processor 506. In this way, the cache 503 can provide a performance boost that decreases or eliminates processor delays in the processor 506 due to waiting for data. Using modules, methods, and services such as those described herein, the processor 506 can be configured to perform various actions. In some examples, the cache 503 may include multiple types of cache including, for example, level one (L1) and level two (L2) cache. The memory 505 may be referred to herein as system memory or computer system memory. The memory 505 may include, at various times, elements of an operating system, one or more applications, data associated with the operating system or the one or more applications, or other such data associated with the computing device 502.

Other system memory 505 can be available for use as well. The memory 505 can include multiple different types of memory with different performance characteristics. The processor 506 can include any general-purpose processor and one or more hardware or software services, such as service 504 stored in storage device 517, configured to control the processor 506 as well as a special-purpose processor where software instructions are incorporated into the actual processor design. The processor 506 can be a completely self-contained computing system, containing multiple cores or processors, connectors (e.g., buses), memory, memory controllers, caches, etc. In some examples, such a self-contained computing system with multiple cores is symmetric. In some examples, such a self-contained computing system with multiple cores is asymmetric. In some examples, the processor 506 can be a microprocessor, a microcontroller, a digital signal processor ("DSP"), or a combination of these and/or other types of processors. In some examples, the processor 506 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 501, an input device 616 can represent any number of input mechanisms, such as a microphone for speech, a touch-sensitive screen for gesture or graphical input, keyboard, mouse, motion input, pen, and other such input devices. An output device 508 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 501. In some examples, the input device 507 and/or the output device 508 can be coupled to the computing device 502 using a remote connection device such as, for example, a communication interface such as the network interface 509 described herein. In such examples, the communication interface can govern and manage the input and output received from the attached input device 507 and/or output device 508. As may be contemplated, there is no restriction on operating on any particular hardware arrangement and accordingly the basic features here may easily be substituted for other hardware, software, or firmware arrangements as they are developed.

In some examples, the storage device 517 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 517 can include hardware and/or software services such as service 504 that can control or configure the processor 506 to perform one or more functions including, but not limited to, the methods, processes, functions, systems, and services described herein in various examples. In some examples, the hardware or software services can be implemented as modules. As illustrated in example computing system architecture 501, the storage device 517 can be connected to other parts of the computing device 502 using the system connection 516. In some examples, a hardware service or hardware module such as service 504, that performs a function can include a software component stored in a non-transitory computer-readable medium that, in connection with the necessary hardware components, such as the processor 506, connection 516, cache 503, storage device 517, memory 505, input device 507, output device 508, and so forth, can carry out the functions such as those described herein.

The disclosed systems and service of a session module (e.g., session module 102 described herein at least in connection with FIG. 1) can be performed using a computing system such as the example computing system illustrated in FIG. 5, using one or more components of the example computing system architecture 500. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some examples, the processor can be configured to carry out some or all of methods and systems for facilitating communication sessions using a session module (e.g., session module 102 described herein at least in connection with FIG. 1) described herein by, for example, executing code using a processor such as processor 506 wherein the code is stored in memory such as memory 505 as described herein. One or more of a user device, a provider server or system, a database system, or other such devices, services, or systems may include some or all of the components of the computing system such as the example computing system illustrated in FIG. 5, using one or more components of the example computing system architecture 501 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital representative (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 513. Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 506 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 505 can be coupled to the processor 506 by, for example, a connector such as connection 516, or a bus. As used herein, a connector or bus such as connection 516 is a communications system that transfers data between components within the computing device 502 and may, in some examples, be used to transfer data between computing devices. The connection 516 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 505 can include RAM including, but not limited to, dynamic RAM (DRAM), static RAM (SRAM), synchronous dynamic RAM (SDRAM), non-volatile random-access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 614 can also include magnetic or optical data storage media including read-only (e.g., CD ROM and DVD ROM) or otherwise (e.g., CD or DVD). The memory can be local, remote, or distributed.

As described above, the connection 516 (or bus) can also couple the processor 506 to the storage device 517, which may include non-volatile memory or storage, and which may also include a drive unit. In some examples, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data may be written, by a direct memory access process, into memory during execution of software in a computer system. The non-volatile memory or storage can be local, remote, or distributed. In some examples, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some examples (e.g., for large programs) it may not be possible to store the entire program and/or data in the memory at any one time. In such examples, the program and/or data can be moved in and out of memory from, for example, an additional storage device such as storage device 517. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 516 can also couple the processor 506 to a network interface device such as the network interface 509. The interface can include one or more of a modem or other such network interfaces including, but not limited to those described herein. It will be appreciated that the network interface 509 may be considered to be part of the computing device 502 or may be separate from the computing device 502. The network interface 509 can include one or more of an analog modem, Integrated Services Digital Network (ISDN) modem, cable modem, token ring interface, satellite transmission interface, or other interfaces for coupling a computer system to other computer systems. In some examples, the network interface 509 can include one or more input and/or output (I/O) devices. The I/O devices can include, by way of example but not limitation, input devices such as input device 507 and/or output devices such as output device 508. For example, the network interface 509 may include a keyboard, a mouse, a printer, a scanner, a display device, and other such components. Other examples of input devices and output devices are described herein. In some examples, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some examples, the computing device 502 can be connected to one or more additional computing devices such as computing device 511 via a network 510 using a connection such as the network interface 509. In such examples, the computing device 511 may execute one or more services 512 to perform one or more functions under the control of, or on behalf of, programs and/or services operating on computing device 502. In some examples, a computing device such as computing device 511 may include one or more of the types of components as described in connection with computing device 502 including, but not limited to, a processor such as processor 506, a connection such as connection 516, a cache such as cache 503, a storage device such as storage device 517, memory such as memory 505, an input device such as input device 507, and an output device such as output device 508. In such examples, the computing device 511 can carry out the functions such as those described herein in connection with computing device 502. In some examples, the computing device 502 can be connected to a plurality of computing devices such as computing device 511, each of which may also be connected to a plurality of computing devices such as computing device 511. Such an example may be referred to herein as a distributed computing environment.

The network 510 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 510 can be wired connections, wireless connections, or combinations thereof. Communications via the network 510 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 510, within the computing device 502, within the computing device 511, or within the computing resources provider 513 can include information, which also may be referred to herein as content. The information may include text, graphics, audio, video, haptics, and/or any other information that can be provided to a user of the computing device such as the computing device 502. In some examples, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 502 and presented to a user of the computing device 502 using forms that are perceptible via sight, sound, smell, taste, touch, or other such mechanisms. In some examples, communications over the network 510 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some examples, the computing device 502 and/or the computing device 511 can be connected to a computing resources provider 513 via the network 510 using a network interface such as those described herein (e.g., network interface 509). In such examples, one or more systems (e.g., service 514 and service 515) hosted within the computing resources provider 513 (also referred to herein as within "a computing resources provider environment") may execute one or more services to perform one or more functions under the control of, or on behalf of, programs and/or services operating on computing device 502 and/or computing device 511. Systems such as service 514 and service 515 may include one or more computing devices such as those described herein to execute computer code to perform the one or more functions under the control of, or on behalf of, programs and/or services operating on computing device 502 and/or computing device 511.

For example, the computing resources provider 513 may provide a service, operating on service 514 to store data for the computing device 502 when, for example, the amount of data that the computing device 502 exceeds the capacity of storage device 517. In another example, the computing resources provider 513 may provide a service to first instantiate a virtual machine (VM) on service 515, use that VM to access the data stored on service 515, perform one or more operations on that data, and provide a result of those one or more operations to the computing device 502. Such operations (e.g., data storage and VM instantiation) may be referred to herein as operating "in the cloud," "within a cloud computing environment," or "within a hosted virtual machine environment," and the computing resources provider 513 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 513 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, server-less hosting, virtual reality (VR) systems, and augmented reality (AR) systems. Various techniques to facilitate such services include, but are not limited to, virtual machines, virtual storage, database services, system schedulers (e.g., hypervisors), resource management systems, various types of short-term, mid-term, long-term, and archival storage devices, etc.

As may be contemplated, the systems such as service 514 and service 515 may implement versions of various services (e.g., the service 504 or the service 512) on behalf of, or under the control of, computing device 502 and/or computing device 511. Such implemented versions of various services may involve one or more virtualization techniques so that, for example, it may appear to a user of computing device 502 that the service 504 is executing on the computing device 502 when the service is executing on, for example, service 514. As may also be contemplated, the various services operating within the computing resources provider 513 environment may be distributed among various systems within the environment as well as partially distributed onto computing device 511 and/or computing device 502.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a keypad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 502) include, but is not limited to, desktop computers, laptop computers, server computers, hand-held computers, tablets, smart phones, personal digital representatives, digital home representatives, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory, or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the example method 400 of FIG. 4). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some examples, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, linear classification, artificial neural networks, anomaly detection, and such. More generally, machine learning or artificial intelligence methods may include regression analysis, dimensionality reduction, meta-learning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general-purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital representative (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computing device 502.

The following examples illustrate various aspects of the present disclosure. As used below, any reference to a series of examples is to be understood as a reference to each of those examples disjunctively (e.g., "Examples 1-4" is to be understood as "Examples 1, 2, 3, or 4").

Example 1 is a computer-implemented method, comprising: generating a communication session; receiving one or more communication requests from one or more user devices, wherein the one or more communication requests include an associated resource, and wherein the one or more user devices are associated with a weight value; combining the one or more communication requests and the associated resources into an object associated with the communication session; determining an impacted group of user devices using a random number generator biased by the weight values associated with the one or more user devices, wherein the impacted group includes at least one of the one or more user devices; deriving a value of the object to be allocated to user devices of the impacted group, wherein the value of the object is based on the associated resources; and allocating a quantity of resources corresponding to the value of the object to the user devices of the impacted group.

Example 2 is the computer-implemented method of example 1, further comprising: receiving activity data; and modifying the weight values associated with the one or more user devices according to the activity data.

Example 3 is the computer-implemented method of example(s) 1-2, wherein the activity data is received from one or more sensors associated with the one or more user devices, and wherein the sensors include a gyroscope, an accelerometer, a camera, a microphone, or a near-field communication (NFC) chip.

Example 4 is the computer-implemented method of example(s) 1-3, wherein the random number generator uses a seed value based on the activity data.

Example 5 is the computer-implemented method of example(s) 1-4, wherein the value of the object is greater than or equal to the associated resource of a user device included in the impacted group of user devices.

Example 6 is the computer-implemented method of example(s) 1-5, further comprising: receiving a first withhold value of the object associated with the communication session; and transmitting the first withhold value of the object to a server associated with the communication session.

Example 7 is the computer-implemented method of example(s) 1-6, wherein a request to initiate the communication session is received from a managing user device, and further comprising: receiving a second withhold value of the object associated with the communication session; and transmitting the second withhold value of the object to the managing user device.

Example 8 is the computer-implemented method of example(s) 1-7, wherein the communication session is generated based on a template, and wherein the template includes one or more session settings associated with the communication session including at least one of geographic restrictions, privacy settings, a minimum value of the associated resource of the one or more user devices, or limitations on a quantity of the one or more user devices.

Example 9 is the computer-implemented method of example(s) 1-8, wherein the communication session is generated based on a template, and wherein the template includes a duration of time during which the one or more communication requests can be received from the one or more user devices.

In general, the routines executed to implement the implementations of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the examples as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate examples and does not impose a limitation on the scope unless otherwise claimed. Such language in the specification should not be construed as indicating any non-claimed element is required for the practice of the examples described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 45 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods, and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

The foregoing detailed description of the technology has been presented for purposes of illustration and description. It is not intended to be exhaustive or to limit the technology to the precise form disclosed. Many modifications and variations are possible in light of the above teaching. The described examples were chosen in order to best explain the principles of the technology, its practical application, and to enable others skilled in the art to utilize the technology in various examples and with various modifications as are suited to the particular use contemplated. It is intended that the scope of the technology be defined by the claim.

What is claimed is:

1. A computer-implemented method, comprising:
- generating a communication session;
- receiving one or more communication requests from a set of user devices, wherein each communication request includes an associated resource, and wherein the set of user devices is associated with a weight value;
- combining the one or more communication requests and each associated resource resources into an object associated with the communication session;
- receiving a first withhold value of the object associated with the communication session;
- transmitting the first withhold value of the object to a server associated with the communication session;
- defining a subset of user devices from the set of user devices using a random number generator biased by the weight value associated with the set of user devices, wherein the subset of user devices includes one or more user devices;
- deriving a value of the object to be allocated to the subset of user devices, wherein the value of the object is based on at least one associated resource of the one or more communication requests; and
- allocating a quantity of resources corresponding to the value of the object to the subset of user devices.

2. The computer-implemented method of claim 1, further comprising:
- receiving activity data; and
- modifying the weight value associated with the set of user devices according to the activity data.

3. The computer-implemented method of claim 2, wherein the activity data is received from one or more sensors associated with the set of user devices, and wherein the one or more sensors include a gyroscope, an accelerometer, a camera, a microphone, or a near-field communication (NFC) chip.

4. The computer-implemented method of claim 2, wherein the random number generator uses a seed value based on the activity data.

5. The computer-implemented method of claim 1, wherein the value of the object is greater than or equal to the associated resource that is associated with a user device of the subset of user devices.

6. The computer-implemented method of claim 1, wherein a request to initiate the communication session is received from a managing user device, and further comprising:
- receiving a second withhold value of the object associated with the communication session; and
- transmitting the second withhold value of the object to the managing user device.

7. The computer-implemented method of claim 1, wherein the communication session is generated based on a template, and wherein the template includes one or more session settings associated with the communication session including at least one of geographic restrictions, privacy settings, a minimum value of the associated resource of the set of user devices, or limitations on a quantity of the set of user devices.

8. The computer-implemented method of claim 1, wherein the communication session is generated based on a template, and wherein the template includes a duration of time where the one or more communication requests can be received from the set of user devices.

9. A system comprising:
- one or more processors; and
- a memory storing instructions that, as a result of being executed by the one or more processors, cause the system to perform operations including:
  - generating a communication session;
  - receiving one or more communication requests from a set of user devices, wherein each communication request includes an associated resource, and wherein the set of user devices is associated with a weight value;
  - combining the one or more communication requests and each associated resource into an object associated with the communication session;
  - receiving a first withhold value of the object associated with the communication session;
  - transmitting the first withhold value of the object to a server associated with the communication session;
  - defining a subset of user devices from the set of user devices using a random number generator biased by the weight value associated with the set of user devices, wherein the subset of user devices includes one or more user devices;
  - deriving a value of the object to be allocated to the subset of user devices, wherein the value of the object is based on at least one associated resource of the one or more communication requests; and
  - allocating a quantity of resources corresponding to the value of the object to the subset of user devices.

10. The system of claim 9, wherein the instructions further cause the system to perform the method further comprising:
- receiving activity data; and
- modifying the weight value associated with the set of user devices according to the activity data.

11. The system of claim 10, wherein the activity data is received from one or more sensors associated with the set of user devices, and wherein the one or more sensors include a gyroscope, an accelerometer, a camera, a microphone, or a near-field communication (NFC) chip.

12. The system of claim 10, wherein the random number generator uses a seed value based on the activity data.

13. The system of claim 9, wherein the value of the object is greater than or equal to the associated resource of a user device of the subset of user devices.

14. The system of claim 9, wherein a request to initiate the communication session is received from a managing user device, and further comprising:

receiving a second withhold value of the object associated with the communication session; and transmitting the second withhold value of the object to the managing user device.

15. The system of claim 9, wherein the communication session is generated based on a template, and wherein the template includes one or more session settings associated with the communication session including at least one of geographic restrictions, privacy settings, a minimum value of the associated resource of the set of user devices, or limitations on a quantity of the set of user devices.

16. The system of claim 9, wherein the communication session is generated based on a template, and wherein the template includes a duration of time where the one or more communication requests can be received from the set of user devices.

17. A non-transitory computer-readable storage media storing instructions that, as a result of being executed by one or more processors, cause the one or more processors to perform operations including:

generating a communication session;

receiving one or more communication requests from a set of user devices, wherein each communication request includes an associated resource, and wherein the set of user devices is associated with a weight value;

combining the one or more communication requests and each associated resource into an object associated with the communication session;

receiving a first withhold value of the object associated with the communication session;

transmitting the first withhold value of the object to a server associated with the communication session;

defining a subset of user devices from the set of user devices using a random number generator biased by the weight value associated with the set of user devices, wherein the subset of user devices includes one or more user devices;

deriving a value of the object to be allocated to the subset of user devices, wherein the value of the object is based on at least one associated resource of the one or more communication requests; and allocating a quantity of resources corresponding to the value of the object to the subset of user devices.

18. The non-transitory computer-readable storage media of claim 17, wherein the operations further include:

receiving activity data; and modifying the weight value associated with the set of user devices according to the activity data.

* * * * *